United States Patent
Dalitz et al.

(10) Patent No.: US 8,056,551 B2
(45) Date of Patent: Nov. 15, 2011

(54) METHOD AND SYSTEM FOR MANUFACTURING WAFER-LIKE SLICES FROM A SUBSTRATE MATERIAL

(75) Inventors: Lothar Dalitz, Glashuetten (DE); Rolf Berndt, Dietzenbach (DE)

(73) Assignee: Pall Corporation, Port Washington, NY (US)

( * ) Notice: Subject to any disclaimer, the term of this patent is extended or adjusted under 35 U.S.C. 154(b) by 529 days.

(21) Appl. No.: 12/299,019

(22) PCT Filed: Oct. 30, 2007

(86) PCT No.: PCT/EP2007/009406
§ 371 (c)(1),
(2), (4) Date: Nov. 17, 2008

(87) PCT Pub. No.: WO2009/056153
PCT Pub. Date: May 7, 2009

(65) Prior Publication Data
US 2010/0170495 A1    Jul. 8, 2010

(51) Int. Cl.
*B28D 1/06* (2006.01)
(52) U.S. Cl. ....... 125/16.02; 125/21; 451/488; 451/446; 210/663; 210/651
(58) Field of Classification Search ............... 125/16.01, 125/16.02, 21; 451/36, 60, 446, 488, 450; 83/651.1, 169, 98; 210/663, 669, 651, 702, 210/770, 806, 767
See application file for complete search history.

(56) References Cited

U.S. PATENT DOCUMENTS

| | | | | |
|---|---|---|---|---|
| 2,994,314 A | * | 8/1961 | Wayland et al. | 125/21 |
| 4,751,006 A | * | 6/1988 | Becker | 210/774 |
| 5,772,900 A | * | 6/1998 | Yorita et al. | 210/805 |
| 5,830,369 A | * | 11/1998 | Toyama | 210/773 |
| 6,001,265 A | * | 12/1999 | Toyama et al. | 210/712 |
| 6,006,738 A | * | 12/1999 | Itoh et al. | 125/21 |
| 6,041,766 A | * | 3/2000 | Vojtechovsky | 125/16.02 |

(Continued)

FOREIGN PATENT DOCUMENTS

DE    198 41 492    3/2000

(Continued)

OTHER PUBLICATIONS

Meyer Burger, Slicing systems for more performance, Wire Saw DS 265, pp. 1-8, Aug. 2006.

(Continued)

*Primary Examiner* — George Nguyen
(74) *Attorney, Agent, or Firm* — Leydig, Voit & Mayer, Ltd.

(57) ABSTRACT

The present invention relates to a method and a system for manufacturing wafer-like slices from a body of a substrate material, especially for use in the manufacture of semiconductor devices. The method comprises providing a slicing device with a cutting wire equipped on its surface with abrasive particles; providing an aqueous cooling and lubricating fluid, said fluid having an ionic strength corresponding to an electrical conductivity of about 30 IJS/cm or less; cutting said body with said cutting wire into slices while dispensing said cooling and lubricating fluid into a kerf area where said cutting wire contacts and cuts said body, said cooling and lubricating fluid promoting removal of powdered substrate material from said kerf area resulting in spent fluid; and removing said spent fluid from said cutting device and recovering said powdered substrate material from said spent fluid.

22 Claims, 3 Drawing Sheets

U.S. PATENT DOCUMENTS

| | | | |
|---|---|---|---|
| 6,070,570 A * | 6/2000 | Ueoka et al. | 125/22 |
| 6,085,911 A * | 7/2000 | Greenleigh et al. | 209/3 |
| 6,123,606 A * | 9/2000 | Hill et al. | 451/53 |
| 6,161,533 A * | 12/2000 | Katsumata et al. | 125/21 |
| 6,311,684 B1 * | 11/2001 | Hodsden et al. | 125/21 |
| 6,379,224 B1 * | 4/2002 | Ito | 451/41 |
| 6,390,896 B1 | 5/2002 | Huber et al. | |
| 6,615,817 B2 * | 9/2003 | Horio | 125/16.01 |
| 6,656,359 B1 * | 12/2003 | Osuda et al. | 210/636 |
| 6,881,131 B2 * | 4/2005 | Parsells et al. | 451/53 |
| 6,908,554 B2 * | 6/2005 | Jackson | 210/601 |
| 6,945,242 B2 * | 9/2005 | Kondo et al. | 125/21 |
| 7,025,054 B2 * | 4/2006 | Kondo et al. | 125/21 |
| 7,223,344 B2 * | 5/2007 | Zavattari et al. | 210/634 |
| 7,381,323 B2 * | 6/2008 | Umezawa et al. | 210/108 |
| 2005/0155595 A1 | 7/2005 | Kondo et al. | |
| 2007/0034573 A1 * | 2/2007 | Jangbarwala | 210/663 |

FOREIGN PATENT DOCUMENTS

| | | |
|---|---|---|
| EP | 0 791 385 | 8/1997 |
| WO | WO 02/096611 | 12/2002 |

OTHER PUBLICATIONS

Pall Corporation, Optimizing of Sawing and Grinding Operations by Process Water Reclamation, pp. 1-24, presented at Silicon 2006.

* cited by examiner

METHOD AND SYSTEM FOR MANUFACTURING WAFER-LIKE SLICES FROM A SUBSTRATE MATERIAL

BACKGROUND OF THE INVENTION

The present invention relates to a method and a system for manufacturing wafer-like slices from a body of a substrate material, especially for use in the manufacture of semiconductor devices.

Typically, the substrate material is silicon or other semiconductor material, alone or in combination with other materials.

Conventional methods and systems for manufacturing wafer-like slices from a body of a substrate material use sawing machines to cut the body by abrasion into slices. The substrate material in the saw kerf is disintegrated into powder.

There are two different principles for cutting the body of substrate material into wafer-like slices.

One of the two principles (A) combines smooth wires pulled through the hard substrate material while abrasive slurries composed of a viscous liquid (e.g., polyethylene glycol or mineral oil) and abrasive solid particles (e.g., silicon carbide) provide the means for abrading the substrate material in the saw kerf and additionally act as coolant and lubricant as well as carrier for the disintegrated powdery substrate material.

The other principle (B) uses armed wires which are equipped on their surface with abrasive particles, e.g., diamond particles. An aqueous fluid, typically drinking water, is applied for cooling and lubrication. It also serves as a carrier for the disintegrated substrate material. The armed wires have a larger diameter than the smooth wires used according to principle (A). Therefore, the saw kerf resulting in principle (B) is wider than in principle (A).

The general disadvantage of both principles is the substantial loss of valuable substrate material. In many cases, the saw kerf is approximately as wide as the remaining slices. Hence, about 50% of the valuable material is ground into powdery particles, and only 50% remain as solid wafer components or slices which may be used to produce, e.g., silicon wafers for photovoltaic cells and integrated semiconductor circuits. In view of the high purity and the high costs of many of the substrate materials, this loss results in an enormous waste of material and is also a potential source for environmental pollution.

Principle A further suffers from the contamination of the abrasive slurry that is circulated in the system by ground substrate material (so-called kerf loss), metal traces of the wire and the fines of the abrasive material itself generated by wear. As the degree of contamination of the abrasive slurry grows over time, the efficiency of the sawing operation decreases. When the slurry finally becomes ineffective or exhausted, it is drained from the system and must be discarded and replaced by new slurry or sent to a regeneration process prior to re-use. Moreover, the viscous, spent, contaminated slurry sticks to the wafer surfaces and complicates the cleaning of the wafers after cutting.

SUMMARY OF THE INVENTION

The object of the present invention is to provide a method for manufacturing wafer-like slices from a body of substrate material at lower over-all costs.

The above object is solved by a method as defined in claim 1.

The invention further resides in a system as defined in claim 16.

The main advantages of the present invention reside in that a) valuable semiconductor material that has been disintegrated as a kerf loss (powdered substrate material) can be easily reclaimed. The powdered substrate material can be re-melted and used as a raw material for the manufacturing of a new body (e.g., ingot) of substrate material.

Surprisingly, the fluid used according to the present invention having an ion strength corresponding to an electrical conductivity of about 30 µS/cm or less allows an efficient removal and recovery of the powdered substrate material from the spent fluid. The powdered material obtained in a method which uses wires armed with abrasive particles allows a much easier recovery of the powdered substrate material since it is not admixed with the abrasive slurry particles used in the method according to cutting principle A.

b) Furthermore, a large fraction of the spent fluid can be re-used for the cutting process after clarification so that in summary the cost balance is in favor of the inventive method although the kerf loss primarily faced is higher and the costs for the cutting wire is also increased as compared to the costs for the smooth cutting wire of cutting principle A.

c) The aqueous fluid with an electrical conductivity of about 30 µS/cm or less for cooling and lubricating the kerf area and the tool (cutting wire) may easily be supplemented by de-ionized water.

d) Surprisingly, it has turned out that the cleaning of the wafer surfaces which are in contact with the spent fluid is much easier to accomplish than cleaning of wafer surfaces covered with spent viscous slurry.

e) The low ionic strength of the cooling and lubricating fluid ensures a low ionic contamination of the reclaimed powdery substrate material and f) allows easier clarification of the spent fluid and easier cleaning of the wetted wafer surfaces. In addition, cleaning of the wafer surfaces does not require cleaning agents which may add to the environmental pollution capacity of the process.

g) Especially a low content of metal ions, e.g., Mg and Ca, (in the following called minerals) reduces the scaling problem tremendously which not only improves the cutting operation, but also provides cleaner wafer surfaces and a longer service time for the cutting wire. It has to be borne in mind that the cutting operation gives rise to extremely high temperatures at the cutting point which may be in the range of 3,000 to 5,000° C.

h) The use of a low ionic strength of the cooling and lubricating fluid avoids agglomeration of the powdered substrate material and stabilizes the colloidal suspension of the powdered substrate material in the fluid. Therefore, the tendency of deposition of the colloidal substrate material on the surface of the wafers and on the surface of the cutting wire and all of the equipment is substantially decreased, which again increases the lifetime of the cutting wires. Furthermore, any clogging of the conduits of the system is also greatly reduced.

i) Another important aspect is that the cutting velocity may be increased when the ionic strength of the fluid for cooling and lubricating a kerf area is about 30 µS/cm or less because the scaling of the substrate material body and of the cutting wire is minimized.

j) In addition, surprisingly the surface roughness of the slices or wafers obtained is lower than in conventional slicing operations.

k) Moreover, the creation of hydrogen gas may be reduced in case silicon substrate materials are processed. Since silicon is highly reactive in an aqueous surrounding it reacts to silica and hydrogen gas. Hydrogen gas production, however, requires increased safety measures in order to avoid explosive gas casualties.

In addition, the present invention operates with a low viscosity fluid which is generally easier to handle than the viscous fluid used according to principle A.

In the simplest case, pure de-ionized water may be used as aqueous cooling and lubricating fluid.

If a membrane filtration is used for separating the powdered substrate material from the aqueous fluid, then preferably the ionic strength is of 10 µS/cm or less.

Even better results with respect to the separation efficiency are obtained when the cooling and lubricating fluid has an ion strength corresponding to an electrical conductivity of about 10 µS/cm or less.

Because of the separation of the powdered substrate material from the fluid, especially by membrane filtration, easy circulation of the cooling and lubricating fluid after reconditioning of the same is made possible.

In addition, the aqueous cooling and lubricating fluid may comprise minor amounts of additives, selected from lubricants, moisteners, surfactants, coolants, anti-scalants and dispersants which may help to further improve the cooling and lubricating properties of the aqueous fluid. Typically the additives may sum up to about 1% by weight, based on the weight of the fluid.

It is of high importance that the minerals contents are low in order to minimize scaling, and preferred fluids are essentially free from minerals, i.e., the minerals content is about 1 ppm or less.

Preferred cutting wires used for the cutting process comprise a steel wire core.

In further preferred methods, the steel wire core is Ni coated.

The abrasive particles used to equip the surface of the cutting wire may preferably be selected from diamond, corundum and silicon carbide particles.

The size of the abrasive particles of the cutting wire may in the average be of about 5 µm or less, e.g. about 3 µm. These particle sizes provide sufficient abrasion while the increase in diameter of the wire is not excessive.

According to a further preferred method of the present invention, the spent fluid is filtered to recover the powdered substrate material as a concentrate.

Likewise, the filtrate obtained in filtering the spent fluid is preferably recovered as a re-usable fluid.

More preferably, said filtration includes membrane filtration, especially dynamic membrane filtration in the form of micro-filtration or ultra-filtration. This type of filtration or separation is a very effective means to not only recover the powdered substrate material as a concentrate, but also to obtain re-usable fluid from the spent fluid which may easily be re-conditioned for re-use as cooling and lubricating fluid. Reconditioning of the re-usable fluid may be as simple as supplementing the fluid with fresh de-ionized water.

In addition, depending on the composition of the spent cooling and lubricating fluid reconditioning can include an ion exchange treatment in order to remove excess foreign materials, especially abraded metal components from the cutting wire.

Furthermore, reconditioning of the re-usable fluid may include supplement of additives to the extent additives as described above have been used in the original cooling and lubricating fluid.

As mentioned before, the powdered substrate material is recovered in the form of a concentrate. That concentrate is preferably in the form of a liquid and may be subjected to a flocculation process.

To that extent, preferably one or more flocculating agents are dispensed into the concentrate in order to facilitate the flocculation and settling process.

The so treated concentrate (flocculated or non-flocculated) is then preferably subjected to a dewatering process which may include processing the concentrate in a mechanical filter press, a centrifuge, a pressure or suction filter in order to further increase the content of powdered substrate material in the liquid and remove excess fluid therefrom.

Finally, the drying process may include a thermo-drying step.

In a preferred embodiment of to the present invention the spent fluid is subjected to a first filtering step and another solid-liquid separation step, e.g., a second filtration step. A flocculation may be carried out in between the first filtering step and the other solid-liquid separation step.

Preferably, the filtrate obtained in the first filtering step amounts to about 90 volume % or more of the spent fluid. More preferably, the filtrate amounts to about 95 volume % of the spent fluid in the first filtering step.

Correspondingly, the volume represented by the concentrate containing part of the fluid and the powdered substrate material amounts to 10 volume % or less of the spent fluid after the first filtering step. More preferably, the concentrate amounts to approximately 5 volume % of the spent fluid.

After the other solid-liquid separation step, e.g., the second filtering step is applied, the filtrate volume amounts to about 98 volume % of the non-filtrate received in the first filtering step.

As mentioned before, the present method is applicable to a large variety of substrate materials. Typically, the substrate material may be selected from Si, Ge, Ga, As, In, P, GaN, SiC, sapphire, ferrite, ceramics and glass substrates.

The process of the present invention is ideally suited to produce slices for use in the manufacture of photovoltaic cells and also of wafers for the manufacture of integrated semiconductor circuits.

As mentioned before, an inventive system for the manufacture of wafer-like slices according to the present invention is defined in claim 16.

Preferably, the fluid reclamation device includes recycling means for recycling the re-usable fluid to said dispensing unit.

In case the fluid consists essentially of de-ionized water, recycling is very simple to perform and it is just necessary to supplement the reusable fluid with de-ionized water.

If fluid additives are used in the cooling and lubricating fluid, it is preferable that the recycling means comprise means for supplementing said reusable fluid with fluid additives.

The first filtering unit used in the reclamation device is preferably a dynamic membrane filtration element.

The dynamic membrane filtration element, especially in the form of a micro-filtration or ultra-filtration device, allows more economic reclaiming of spent fluid and recycling of the same.

Preferred reclamation devices comprise another solid-liquid separation system, e.g., a second filtering unit, which is preferably used to reduce the fluid content of the concentrate.

To that extent, the other solid-liquid separation system comprises preferably a filter press. The solid material received from the filter press may be directly passed to a drying unit which preferably includes a paddle dryer.

Once the reclamation device comprises a flocculation tank, the concentrate may be periodically pumped to the floculation tank where it is admixed with flocculation agent or agents and then fed to the filter press.

The flocculation step allows for a more complete removal of suspended powdered substrate material and gives rise to a further yield in reclaimed fluid.

Preferably said inventive system comprises a holding tank receiving the spent fluid from the draining unit. The spent fluid is then transferred from the holding tank to the first filtration device and serves as a buffer tank. The capacity of the holding tank is designed such that the concentrate obtained from the first filtering unit may be recycled as retentate to the holding for some time prior to discharging it to the drying unit. Thereby, the total solid content in the concentrate can be increased from, e.g., about 0.5% (w/w) in the spent fluid to, e.g., about 10% (w/w) in the concentrate. Thereby, the volume of concentrate to be processed may be greatly reduced.

BRIEF DESCRIPTION OF THE DRAWINGS

The above advantages are described in the following in connection with the figures and one detailed example. In the Figures.

DETAILED DESCRIPTION OF THE INVENTION

Figure 1:
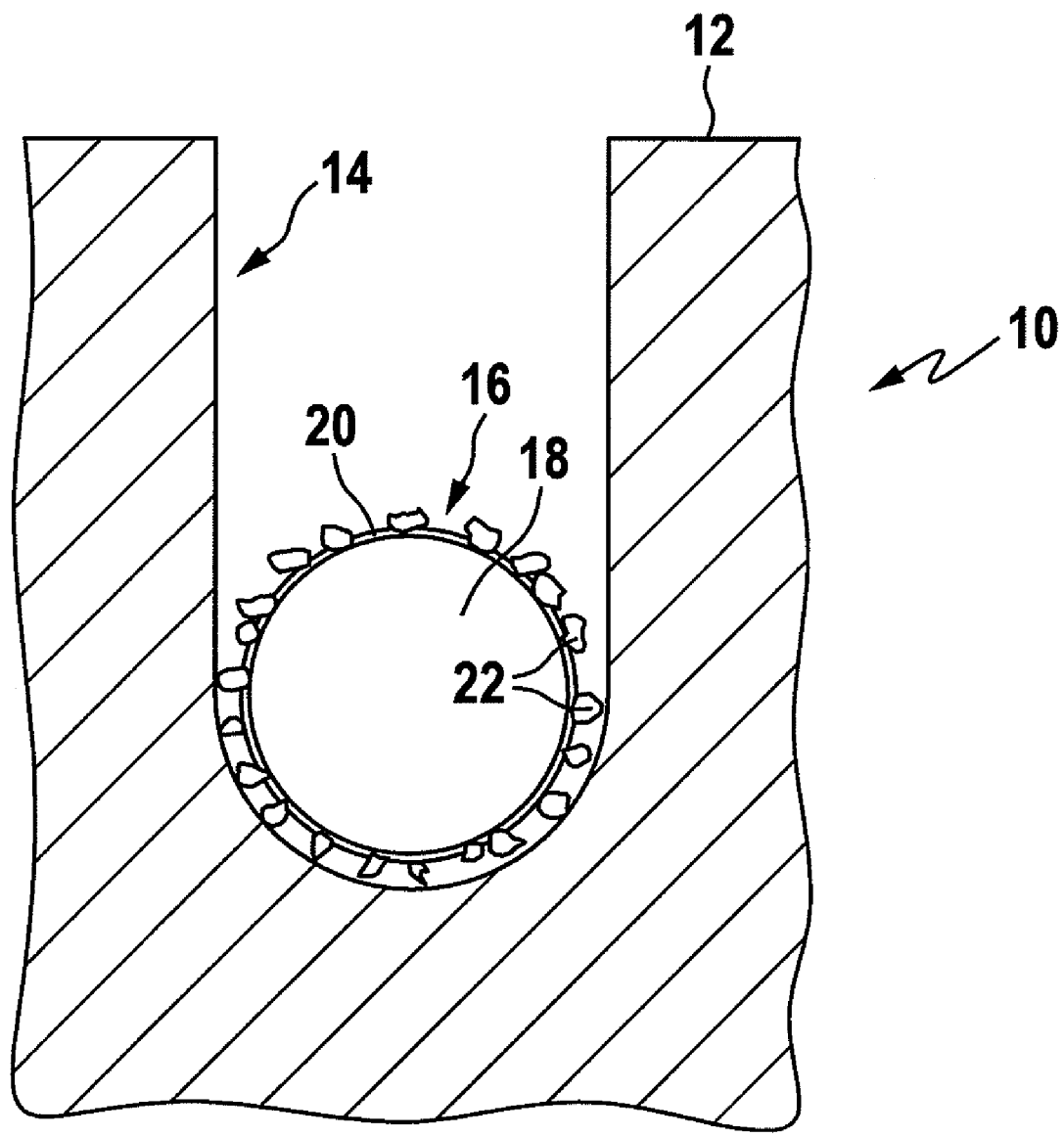
FIG. 1 shows a schematic representation of a cutting wire in a kerf of a substrate material body.

FIG. 1 shows a cut-out of a cross-sectional representation of an ingot body 10 which has been cut to a certain depth starting from an outer circumference 12 to produce a kerf 14. Within said kerf 14, a cutting wire 16 is positioned which comprises a steel wire core 18 which has a Ni coating 20 on its outer surface. Furthermore, the cutting wire 16 has on its outer surface abrasive particles in the form of diamond particles 22 attached the size of which is in the average about 3 μm.

In order to cool and lubricate the cutting wire 16 and the ingot body 10, a fluid is dispensed into the kerf area 14, especially where the wire 16 contacts the ingot body 10. It is apparent from the schematic drawing of FIG. 1 that a smooth cutting wire would require a smaller width of kerf 14 than the presently used abrasive particle equipped wire 16.

The fluid used for cooling and lubricating the kerf area 14 aids to remove powdered ingot substrate material out of kerf area 14, thus facilitating and supporting the cutting operation.

Because of the inventive composition of the aqueous cooling and lubricating fluid which has an ionic strength corresponding to an electrical conductivity of about 30 μS/cm or less, the particles produced during the cutting operation of the cutting wire will be stably suspended in the cooling and lubricating fluid. The cooling and lubricating fluid carrying the powdered substrate material of the ingot body 10 (called in the following spent fluid) is withdrawn from the cutting device. The powdered substrate material is then recovered from the spent fluid.

Figure 2:
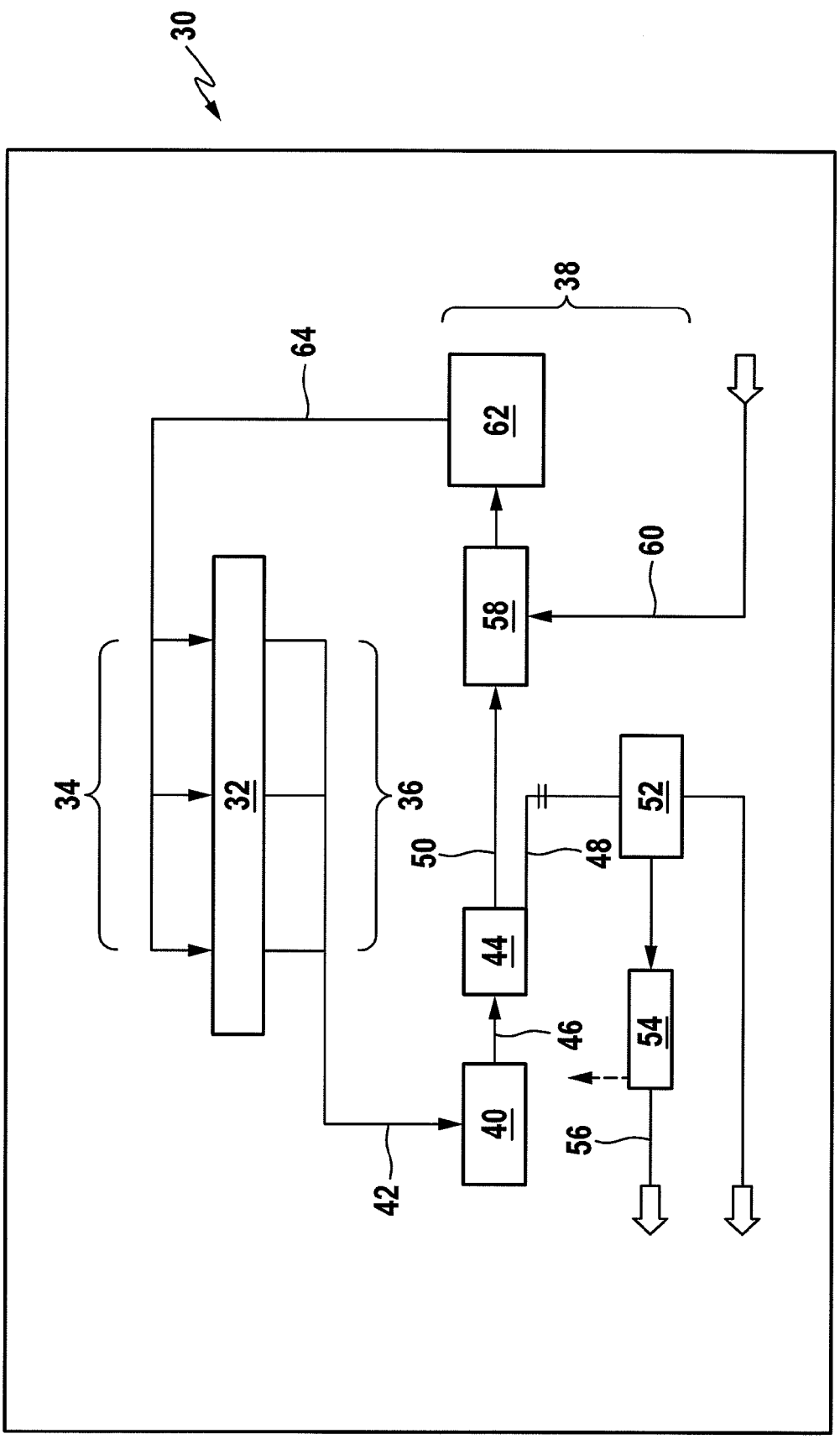
FIG. 2 shows a schematic representation of a preferred embodiment of the system used according to the present invention.

FIG. 2 gives an overview over the main functional parts of the inventive system 30 for manufacturing wafer-like slices.

The system 30 comprises a slicing device 32 provided with a plurality of cutting wires. Said slicing device 32 accommodates a body of substrate material (not shown) which is mounted in the slicing device 32 to be cut into a plurality of slices.

The slicing device 32 comprises a dispensing unit 34 for delivering a cooling and lubricating fluid to kerf areas where the cutting wires contact and cut the substrate material body.

Said system further comprises a draining unit 36 for removing spent fluid from the slicing device 32. The system 30 further comprises a fluid reclamation device 38 which receives the spent fluid from the draining unit 36. The reclamation device 38 comprises a buffer tank 40 which receives the spent fluid from the draining unit 36 via conduit 42. Buffer tank 40 is connected with a filtering unit 44 via a conduit 46. In filtering unit 44, the spent fluid is separated in a concentrate portion and a filtrate portion. The concentrate is drained from the filtering unit 44 via a conduit 48 while the filtrate is drawn off the filtering unit 44 via a conduit 50. Preferably, the ratio of the filtrate and concentrate volumes is selected such that the filtrate to concentrate volume ratio is approximately 9:1 or greater.

The concentrate is delivered via conduit 48 to a de-watering device 52 which preferably operates batch wise. In the de-watering device 52 which preferably comprises a filter press, the concentrate may be treated with a flocculation agent and then filtered in a filter press in order to more completely remove the powdered substrate material from the concentrate and to reclaim further portions of fluid.

The solid material provided by the de-watering device 52 is sent to a dryer 54 where the remaining water content is evaporated so that dry substrate powder leaves the dryer 54 via line 56.

The filtrate removed from filtering unit 44 via conduit 50 is fed into a holding tank 58 where it may be reconditioned by supplying de-ionized water and additives, if the cooling and lubricating fluid is to contain such components. De-ionized water and optionally additives are supplied via a supply line 60 into the holding tank 58. Fluid supply pumps 62 provide reconditioned cooling and lubricating fluid via a supply line 64 to the fluid dispensing unit 34.

Figure 3:
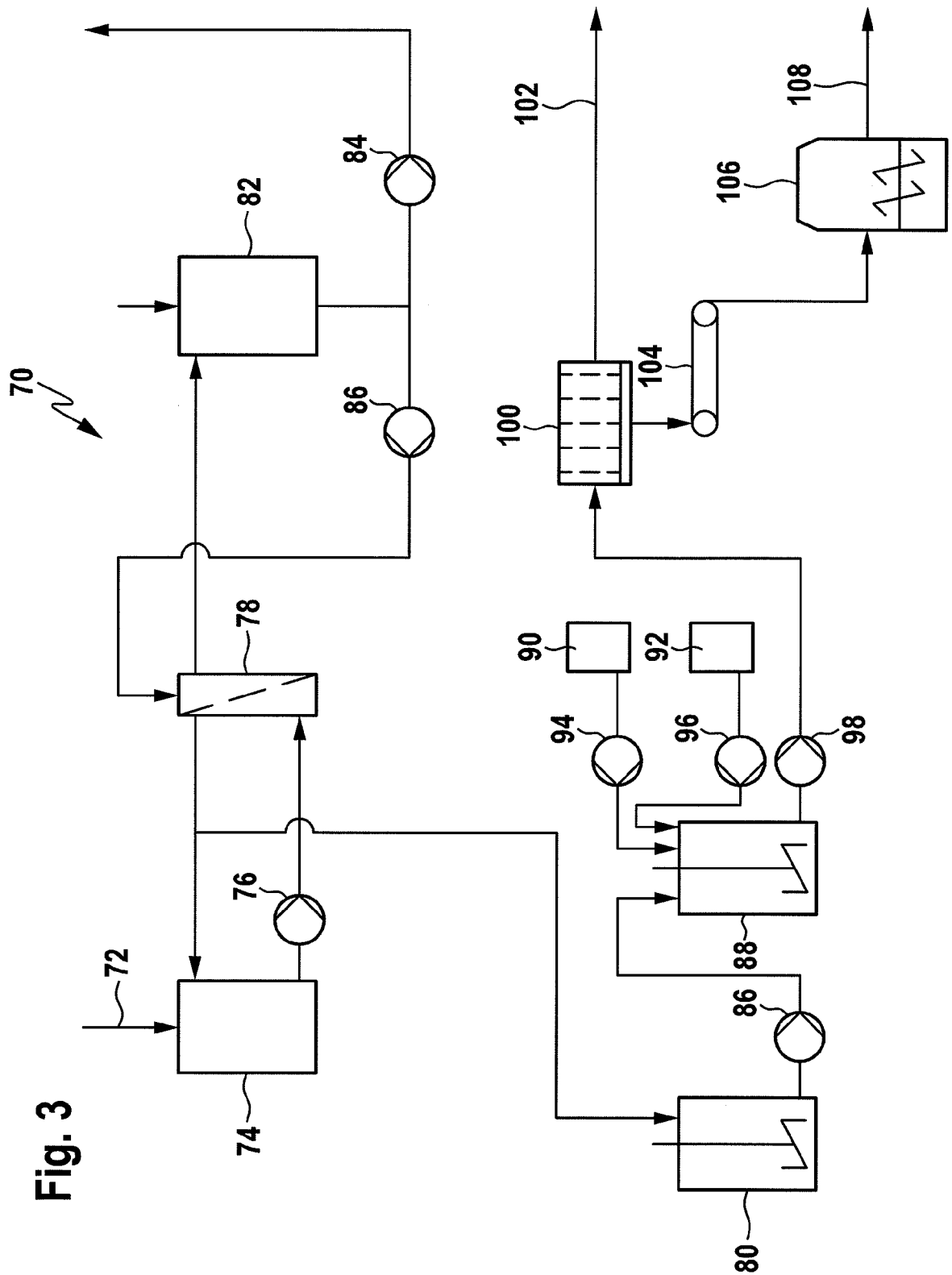
FIG. 3 shows a further preferred embodiment of the inventive system.

A more detailed description of a further embodiment of the present inventive process is given in the following in connection with FIG. 3.

The slicing device has been described in connection with FIG. 2 already and is omitted in FIG. 3. FIG. 3 focuses on the portion 70 of the system provided for fluid reclamation and recovery of powdered substrate material. The description includes a way of an examples specific data for fluid flow, dimensioning of tank volumes, fluid compositions and the like as it may occur when cutting a silicon ingot into slices or wafers.

The spent fluid 72 received from a slicing device with 2,000 kg/hr average (about 2 m$^3$/hr) is collected in a buffer tank 74 (about 2 m$^3$ gross volume). It contains 0.5% (w/w) total suspended solid silicon (TSSi). A feed pump 76 pumps the spent fluid through an ultra-filtration (UF) membrane module 78 comprising 20 m$^2$ surface area. The module separates the spent fluid into an essentially particle-free permeate and a particle-containing concentrate. The larger part of the concentrate (now called retentate) is returned to the buffer tank 74 whereas a smaller part is transferred at 100 kg/hr flow rate to a concentrate tank 80. The TSSi amounts to about 10% (w/w).

The permeate is collected in a holding tank 82 of 2 m$^3$ gross volume where de-ionized water is added to compensate the loss due to the concentrate that left the circuit.

A fluid supply pump 84 forwards the clear fluid back to the slicing device at a rate of 2000 kg/h.

A small part of the permeate is—by means of a backwash pump 86—periodically pumped through the ultra-filtration membrane module 78 in reverse direction in order to clean the membranes thereof.

The ultra-filtration concentrate that had been collected in the concentrate tank 80 contains 10% (w/w) suspended solid silicon. Twice a day the concentrate is discharged by pump 86 to a flocculation tank 88 where it is mixed with aqueous solutions of polymeric flocculants previously prepared and stored in flocculant dosage units 90, 92 by feed pumps 94, 96. Both flocculants (1 kg/hr each on average) are solutions or emulsions from organic polymers based on polyacrylamide, one anionic and the other one cationic. Under agitation, the flocculants promote agglomeration of the silicon particles, significantly improving the filterability of the concentrate.

A feed pump 98 conveys the flocculated concentrate into a filter press 100. Here the silicon particle agglomerates are removed by a filter cloth and form a filter cake whereas clear water penetrates the filter cloth and leaves the system via line 102 at 82 kg/hr flow rate average. By applying high feed pressure during the filtration, the filter cake in the filter press is de-watered, obtaining about 50% residual moisture (w/w). When the filter press is opened, a filter cake (20 kg/hr on average) falls onto a belt conveyor 104. The belt conveyor 104 feeds the pieces of the filter cake into a paddle dryer 106. By means of elevated temperatures above 80° C., the moisture content of the filter cake is volatilized under permanent circulation of the solids. It leaves the dryer housing as water vapor (10 kg/hr on average). The dry silicon powder is discharged from the dryer with 10 kg/hr on average via line 108.

The invention claimed is:

1. A method for manufacturing wafer-like slices from a body of substrate material said method comprising:
   providing a slicing device with a cutting wire equipped on its surface with abrasive particles;
   providing an aqueous cooling and lubricating fluid, said fluid having an ionic strength corresponding to an electrical conductivity of about 30 µS/cm or less;
   cutting said body with said cutting wire into slices while dispensing said cooling and lubricating fluid into a kerf area where said cutting wire contacts and cuts said body, said cooling and lubricating fluid promoting removal of powdered substrate material from said kerf area resulting in spent fluid; and
   removing said spent fluid from said cutting device and recovering said powdered substrate material from said spent fluid.

2. The method of claim 1, wherein said cooling and lubricating fluid has an electrical conductivity of about 10 µS/cm or less.

3. The method of claim 1, wherein said cooling and lubricating fluid is essentially free from minerals.

4. The method of claim 1, wherein said abrasive particles include particles selected from diamond, corundum and silicon carbide particles.

5. The method of claim 1, wherein said abrasive particles of the cutting wire have an average particle size of about 5 µm or less.

6. The method of claim 1, wherein said spent fluid is filtered to recover the powdered substrate material as a concentrate.

7. The method of claim 6, wherein said filtration includes membrane-filtration.

8. The method of claim 6, wherein filtrate obtained in filtering said spent fluid is recovered as a reusable fluid and wherein said reusable fluid is reconditioned prior to reuse as cooling and lubricating fluid.

9. The method of claim 8, wherein said reconditioning of said reusable fluid includes an ion exchange treatment.

10. The method of claim 6, wherein said concentrate is subjected to flocculation.

11. The method of claim 6, wherein the concentrate is subjected to a dewatering process.

12. The method of claim 6, including a first filtration and a subsequent solid-liquid separation.

13. The method of claim 12, wherein flocculation is carried out in between the first filtration and the subsequent solid-liquid separation.

14. The method of claim 12, wherein the filtrate amounts to about 90 vol. % or more of the spent fluid in the first filtration.

15. The method of claim 1, wherein said substrate material of said body is selected from Si, Ge, GaAs, InP, GaN, SiC, sapphire, ferrite, ceramics and glass.

16. A system for the manufacture of wafer-like slices from a body of substrate material for use in the manufacture of semiconductor devices, said system comprising
   a slicing device provided with a cutting wire, said cutting wire being equipped on its surface with abrasive particles, said slicing device comprising a dispensing unit for delivering a cooling and lubricating fluid having an iconic strength corresponding to an electrical conductivity of about 30 µS/cm or less to a kerf area where said cutting wire contacts and cuts said body; wherein said fluid promotes removal of powdered substrate material from said kerf area resulting in spent cooling and lubricating fluid;
   a draining unit for removing said spent fluid from said slicing device; and
   a fluid reclamation device for treating said spent fluid, said reclamation device comprising a first filtering unit for separating and recovering said powdered substrate material from said spent fluid and providing a reusable fluid.

17. The system of claim 16, wherein said fluid reclamation device includes recycling means for recycling the reusable fluid to said dispensing unit.

18. The system of claim 16, wherein said first filtering unit comprises a dynamic membrane filtration element.

19. The system of claim 16, wherein said reclamation device comprises another solid-liquid separation device.

20. The system of claim 16, wherein said reclamation device comprises a flocculation tank receiving said powdered substrate from said first filtering unit as a concentrate.

21. The system of claim 16, wherein said reclamation device comprises a dewatering unit.

22. The system of claim 16, comprising a holding tank to receive spent fluid from draining unit, and a recycling line for a concentrate obtained in said first filtering unit, said recycling line being in fluid communication with said holding tank.

* * * * *